United States Patent
El Naga et al.

(10) Patent No.: US 11,020,800 B2
(45) Date of Patent: Jun. 1, 2021

(54) APPARATUS AND METHODS FOR SEALING POWDER HOLES IN ADDITIVELY MANUFACTURED PARTS

(71) Applicant: DIVERGENT TECHNOLOGIES, INC., Los Angeles, CA (US)

(72) Inventors: Eahab Nagi El Naga, Topanga, CA (US); Ross Harrison Byers, Manhattan Beach, CA (US); Keith Allen Fleming, Torrance, CA (US); Steven Blair Massey, Jr., Torrance, CA (US); Narender Shankar Lakshman, Hermosa Beach, CA (US); Antonio Bernerd Martinez, El Segundo, CA (US)

(73) Assignee: Divergent Technologies, Inc., Los Angeles, CA (US)

( * ) Notice: Subject to any disclaimer, the term of this patent is extended or adjusted under 35 U.S.C. 154(b) by 340 days.

(21) Appl. No.: 15/968,708

(22) Filed: May 1, 2018

(65) Prior Publication Data
US 2019/0337056 A1    Nov. 7, 2019

(51) Int. Cl.
| | |
|---|---|
| B22F 3/24 | (2006.01) |
| B33Y 10/00 | (2015.01) |
| B33Y 80/00 | (2015.01) |
| B33Y 40/00 | (2020.01) |
| B22F 10/00 | (2021.01) |

(52) U.S. Cl.
CPC ................ B22F 3/24 (2013.01); B22F 10/00 (2021.01); B33Y 10/00 (2014.12); B33Y 40/00 (2014.12); B33Y 80/00 (2014.12); *B22F 2003/247* (2013.01)

(58) Field of Classification Search
None
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 10,449,880 B2, 10/2019, Mizobata et al. (withdrawn)

*Primary Examiner* — David Sample
*Assistant Examiner* — Elizabeth Collister
(74) *Attorney, Agent, or Firm* — Arent Fox LLP

(57) ABSTRACT

Apparatus and methods for sealing powder holes in additively manufactured parts are presented herein. Powder holes are co-printed to facilitate post processing sealing. Embodiments include co-printed caps, friction welded caps, rivets, silicone plugs, co-printed tangs, multiple micro holes, layup, and spin forming. By using one or more of the above techniques, powder holes can be sealed on additively manufactured parts.

13 Claims, 12 Drawing Sheets

(56) References Cited

U.S. PATENT DOCUMENTS

| | | |
|---|---|---|
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B1 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |

(56) References Cited

U.S. PATENT DOCUMENTS

| | | |
|---|---|---|
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |

(56) References Cited

U.S. PATENT DOCUMENTS

| | | | |
|---|---|---|---|
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2008/0290215 A1* | 11/2008 | Udall | F01D 5/147 244/123.14 |
| 2014/0277669 A1 | 9/2014 | Nardi et al. | |
| 2017/0113344 A1 | 4/2017 | Schönberg | |
| 2017/0184108 A1* | 6/2017 | Scancarello | F04C 18/0215 |
| 2017/0341309 A1 | 11/2017 | Piepenbrock et al. | |
| 2019/0224910 A1* | 7/2019 | Xu | B29C 64/40 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner under, is sealed by adhering an overlay structure over the aperture.

APPARATUS AND METHODS FOR SEALING POWDER HOLES IN ADDITIVELY MANUFACTURED PARTS

BACKGROUND

Field

The present disclosure relates generally to techniques for additively manufacturing parts and components, and more specifically to sealing powder holes in additively manufactured parts.

Background

Recently three-dimensional (3D) printing, also referred to as additive manufacturing, has presented new opportunities to efficiently build parts for automobiles and other transport structures such as airplanes, boats, motorcycles, and the like. Applying additive manufacturing processes to industries that produce these products has proven to produce a more efficient transport structure. An automobile produced using 3D printed components can be made stronger, lighter, and consequently, more fuel efficient. Advantageously, 3D printing, as compared to traditional manufacturing processes, does not significantly contribute to the burning of fossil fuels; therefore, the 3D printing of parts for automobiles can be more eco-friendly than conventional manufacturing techniques.

Automobiles and transport vehicles are constructed with components including panels, extrusions, nodes, and tubes. Additively manufactured parts formed using Powder Bed Fusion (PBF) processes can leave behind residual trapped powder necessitating post processing powder removal steps. Accordingly, there is a need to develop technologies for removing trapped powders in additively manufactured parts, in a manner that minimizes the potential for corrosion or other problems caused by the ingress of fluids into internal portions of the additively manufactured part, for example, during post-processing operations.

SUMMARY

Several aspects of techniques for sealing additively manufactured powder holes will be described more fully hereinafter with reference to three-dimensional (3D) printing techniques.

In one aspect an apparatus comprises an exterior region, an internal lattice structure, and an aperture within the exterior region. The exterior region comprises an inner surface and an external surface. The internal lattice structure is coupled to the inner surface and configured to mechanically support the exterior region. The aperture exposes a portion of the internal lattice structure.

In another aspect a method for additive manufacturing comprises: providing an exterior region; providing an internal lattice structure; and coupling the internal lattice structure to the inner surface to provide support to the exterior region. The exterior region comprises an inner surface, an external surface, and an aperture;

In another aspect a method of manufacturing a transport structure comprises: building a support lattice; building a panel region coupled to the support lattice; and removing powder from a portion of the panel region; and adhering an overlay structure over the aperture. Powder is removed from a portion of the panel region by using an aperture in the panel region In another aspect an additively manufactured (AM) component comprises a surface region, an interior channel, and a removable cap. The interior channel is formed within the AM component and coupled to the surface region. The removable cap is co-printed with the AM component and covers the interior channel at the surface region.

In another aspect an additively manufactured (AM) component comprises a surface region, a powder hole, and at least one segment. The powder hole is located in the surface region and coupled by an interior channel. The interior channel has a channel axis formed within the AM component. The at least one segment extends outward from a circumference of the powder hole.

In another aspect a method of removing a residual powder from an AM component comprises: co-printing at least one AM powder hole in a surface of the AM component; removing the residual powder from the AM component; and sealing the at least one AM powder hole.

It will be understood that other aspects of additively manufacturing powder holes and sealing powder holes will become readily apparent to those skilled in the art from the following detailed description, wherein it is shown and described only several embodiments by way of illustration. As will be appreciated by those skilled in the art, powder holes for removing trapped powder in additively manufactured parts can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for sealing powder holes in additively manufactured parts will now be presented in the detailed description by way of example, and not by way of limitation, in the accompanying drawings, wherein.

DETAILED DESCRIPTION

Figure 1A:
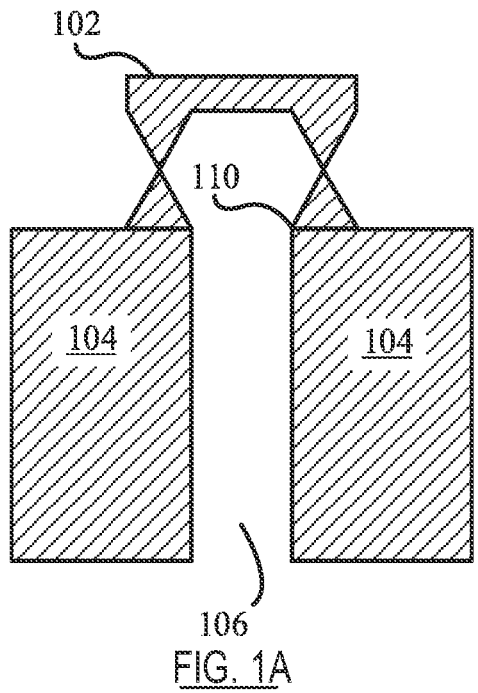
FIG. 1A illustrates a cross section view of an additively manufactured (AM) part and a first co-printed cap according to an embodiment.

The detailed description set forth below in connection with the drawings is intended to provide a description of exemplary embodiments of technology relating to sealing powder holes in additively manufactured (AM) parts, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of powder holes provides significant flexibility and cost saving benefits that enable manufacturers of mechanical structures and mechanized assemblies to manufacture parts and components with complex geometries at a lower cost to the consumer. The sealing of additively manufacture (AM) powder holes, as described in the foregoing, may be used in one or more steps of the process for connecting additively manufactured parts and/or commercial off the shelf (COTS) components. Additively manufactured (AM) parts are printed three-dimensional (3D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like without departing from the scope of the invention.

Additive manufacturing using laser sintering requires post processing steps to remove residual powder. In order to remove residual powder in hard to reach locations of an AM part, powder holes may be co-printed. Although the co-printed powder holes may provide access to the residual powder in an AM part, they also expose regions of the AM part leading to structural weakness, and corrosion. Accordingly, there is a need to develop new powder holes and technologies for powder removal and their seals.

Apparatus and methods for sealing powder holes in additively manufactured parts are presented herein. In an aspect of the disclosure, powder holes may be co-printed with powder hole seals to prevent the ingress of fluids used in post-processing operations, and to prevent corrosion due to the potential introduction of foreign contaminants into the powder holes and their interaction with residual powder material. The seals prevent residual powder from corrosion, and seals against environmental exposure during these operations.

Embodiments of powder hole seals include, without limitation, co-printed caps, friction welded caps, rivets, silicone plugs, co-printed tangs, multiple micro holes, layup, and spin forming. By using one or more of the above techniques, powder holes can be sealed on AM parts to improve part strength and performance.

FIG. 1A illustrates a cross section view 100 of an additively manufactured (AM) part 104 and a co-printed cap 102 according to an embodiment. The AM part 104 has a powder hole region 106. The co-printed cap 102 is additively manufactured to close the powder hole region 106 following residual powder removal. In this exemplary embodiment, the co-printed cap 102 includes two lower hourglass-shaped structures on respective sides of the AM part 104, and an upper flat portion. As shown, the co-printed cap 102 can cover the top surface of the AM part 104. In some embodiments the AM part 104 may be printed at the same time with a cap, slightly offset from the top surface.

The co-printed cap 102 can be configured to break off to remove residual trapped powder so as to advantageously allow the powder to be trapped in the part during post-processing operations. Additionally, the powder cap 102 may shield trapped powder from media and liquids used in post-processing operations. By using the powder cap 102 as a shield, messy coagulation of powder can be avoided and/or reduced.

Once post-processing operations are completed, the co-printed cap 102 may be breached for removing residual powder. In some embodiments the co-printed cap 102 can be configured to break off from the AM part 104 when a mechanical force is applied. In other embodiments, a hole may be drilled in the co-printed cap 102 in order to produce an orifice for removing residual trapped powder.

Additionally, the co-printed cap 102 can be additively manufactured to have a low value for wall thickness. Once the part has been printed and post-processing operations have been performed, a hole may be easy drilled through the thin wall. Thin walls can easily break so as to allow residual powder removal. In some embodiments, the region 110 where the co-printed cap 102 interfaces with the AM part 104 can be additively manufactured to include properties that encourage bond failure, such as a low material density at the interface. Including such properties may facilitate removal of the co-printed cap 102.

Figure 1B:
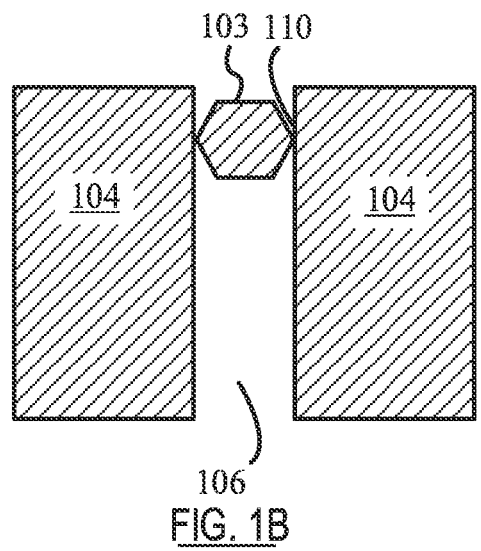
FIG. 1B illustrates a cross section view of an additively manufactured (AM) part and a second co-printed cap according to another embodiment.
Figure 1C:
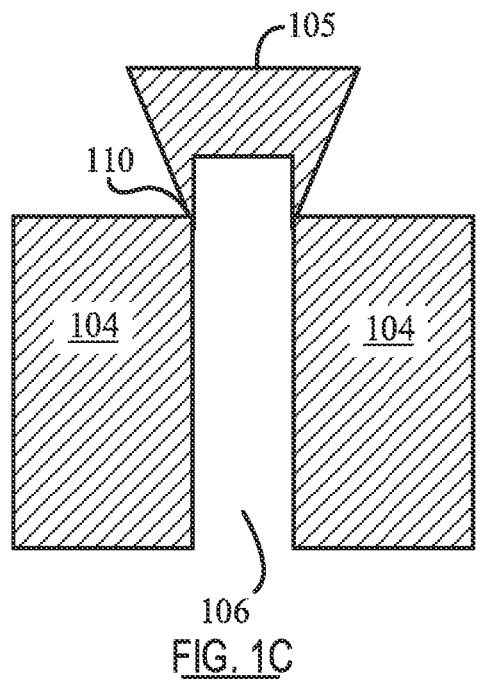
FIG. 1C illustrates a cross section view of an additively manufactured (AM) part and a third co-printed cap according to another embodiment.

FIG. 1B illustrates a cross section view of an additively manufactured (AM) part 104 and a second co-printed cap 103 according to another embodiment. The principles described above apply as well to this embodiment, except that the co-printed cap 103 has a hexagonal shape and is disposed in the interior of powder hole region 106. The co-printed cap 103 can be broken off or breached to remove excess powder. The hexagonal shape of the cap 103 is such that the cap 103 meets the part 104 at essentially a point region 110, which may make removal of the cap 103 easier. FIG. 1C illustrates a cross section view of an additively manufactured (AM) part 104 and a third co-printed cap 105 according to another embodiment. The co-printed cap is angled inward relative to an upper surface of the AM part 104. The interface 110 between the cap co-printed cap 105 and the AM part 104 is also made very small. These features enable easy removal of the co-printed cap 105.

Figure 2A:
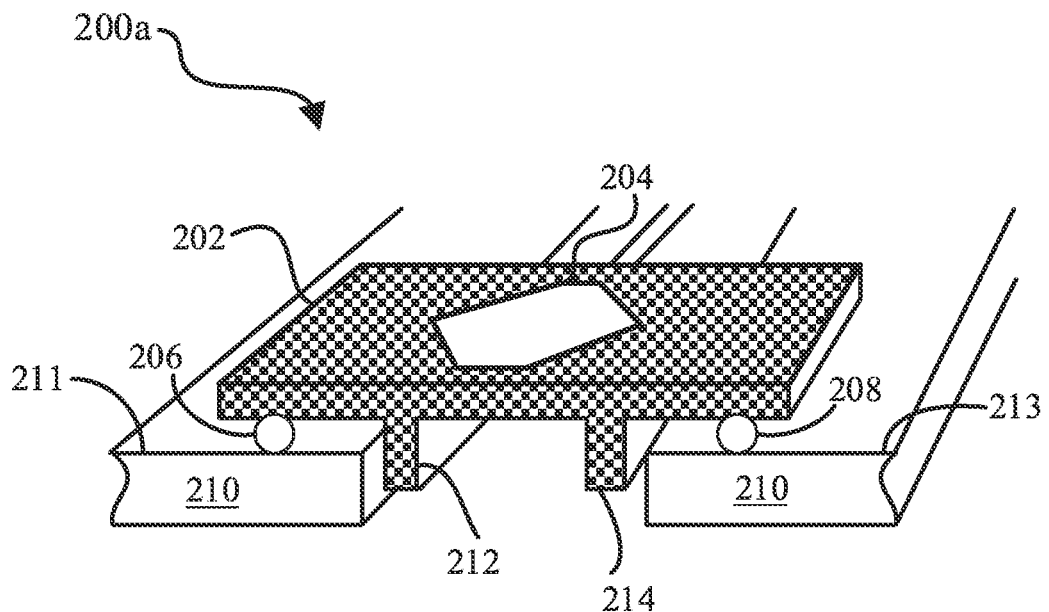
FIG. 2A illustrates a top perspective view of an AM plug positioned for friction welding according to an embodiment.
Figure 2B:
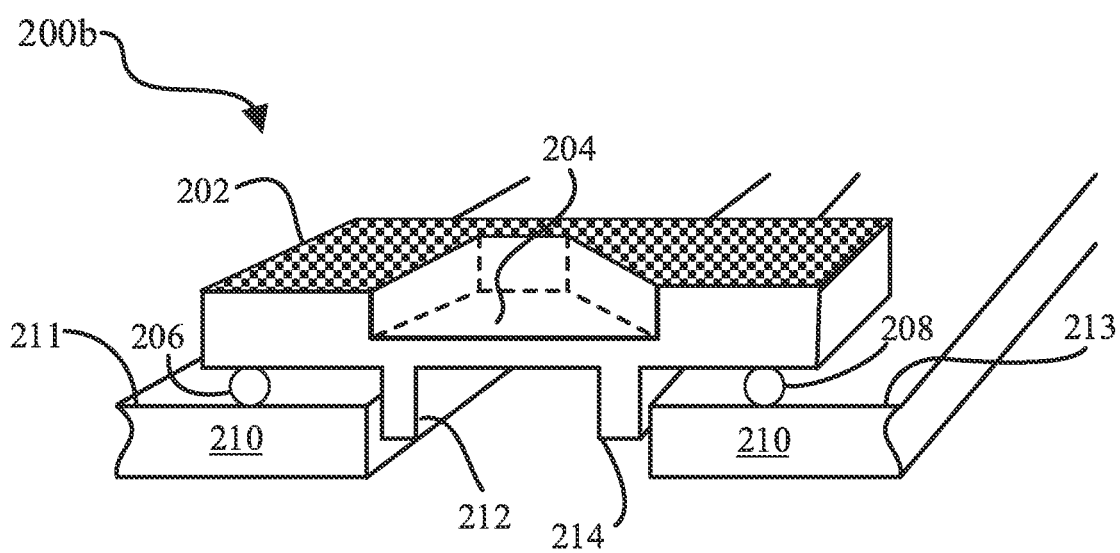
FIG. 2B illustrates a cross section view of the AM plug of FIG. 2A.

FIG. 2A illustrates a top perspective view 200a of an AM plug 202 positioned for friction welding according to an embodiment. FIG. 2B illustrates a cross section view 200b of the AM plug 202. The AM plug 202 is positioned above an AM part 210 with surfaces 211 and 213. As shown in FIGS. 2A-B, the AM plug 202 has a recessed tool coupling feature 204, a locating extension 212, a locating extension 214, a flash projection 206, and a flash projection 208. The flash projections 206 and 208 contact surfaces 211 and 213, respectively.

The tool coupling feature 204 can interface with a tool and/or a robot effector. In an embodiment, the tool coupling feature 204 can be hexagonal in shape. The location extensions can facilitate interfacing the AM plug 202 with AM part 210 above the powder hole region. The flash projections 206 and 208 can be used to form a friction weld between the AM plug 202 and the surfaces 211 and 213.

Friction can be generated between the AM plug 202 and the surfaces 211 and 213 by applying a mechanical force. The AM plug 202 can be configured to rotate so as to generate friction, which in turn creates heat to form the weld.

An upset force can be applied during post-processing in order to remove oxidized material from the surface of AM part 210, thereby completing the bond. Additionally, powder holes can advantageously be standardized for friction welding.

Although FIGS. 2A-B show an embodiment using a hexagonal shape for interfacing with a robot effector, other configurations using alternative shapes are possible.

Figure 3A:
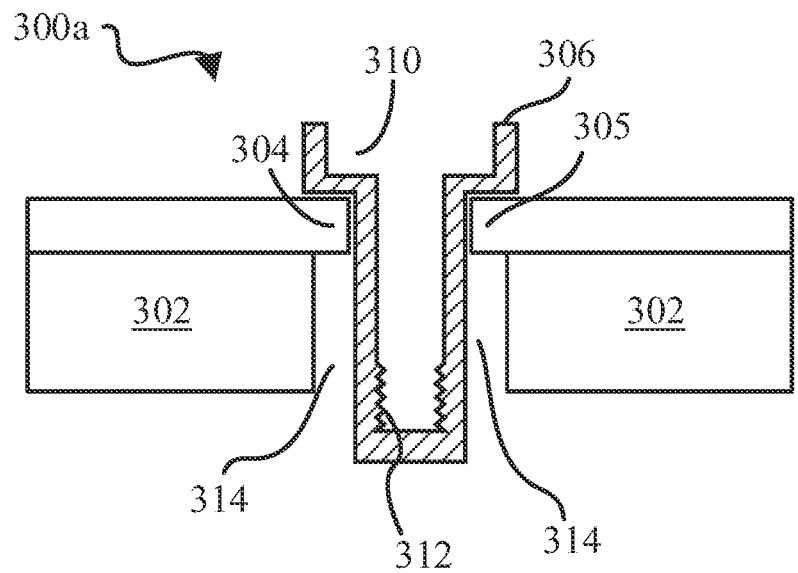
FIG. 3A illustrates a cross section view of a deformable plug with internal threads positioned for sealing a powder hole according to an embodiment.

FIG. 3A illustrates a cross section view 300a of a deformable plug 306 with internal threads 312 positioned for sealing a powder hole 314 within an AM part 302 according to an embodiment. The deformable plug 306 in this embodiment has an open surface region 310 and extends downward into the powder hole 314 to threads 312. The AM part 302 has an extended surface region with extensions 304 and 305. As shown, the deformable plug 306 can be positioned between extensions 304 and 305. In order to install the deformable plug 306, automation tools and robots can be used. In this embodiment, buckling induces deformation of deformable plug 306 and corresponding displacement of internal threads 312.

Figure 3B:
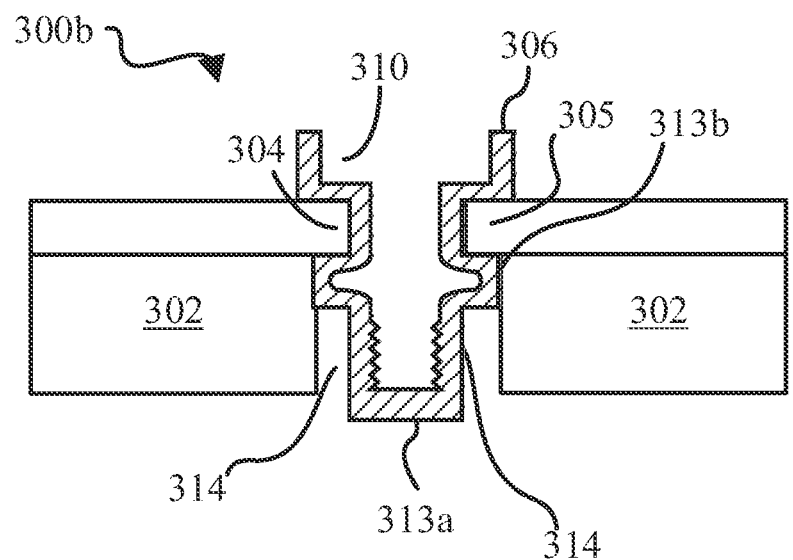
FIG. 3B illustrates a cross section view of the deformable plug of FIG. 3A after sealing the powder hole.

FIG. 3B illustrates a cross section view 300b of the deformable plug 306 after sealing the powder hole 314. The internal threads 312 may, upon buckling, compress to regions 313a and 313b within the powder hole 314. In this way the deformable plug 306 fastens to the AM part 302 and forms a seal. The internal threads 312 of the deformable plug 306 may be used to engage with a mandrel. AM part 302 can then be securely connected via the threads 312 and mandrel to another part, such as another node or a portion of a panel.

Figure 4A:
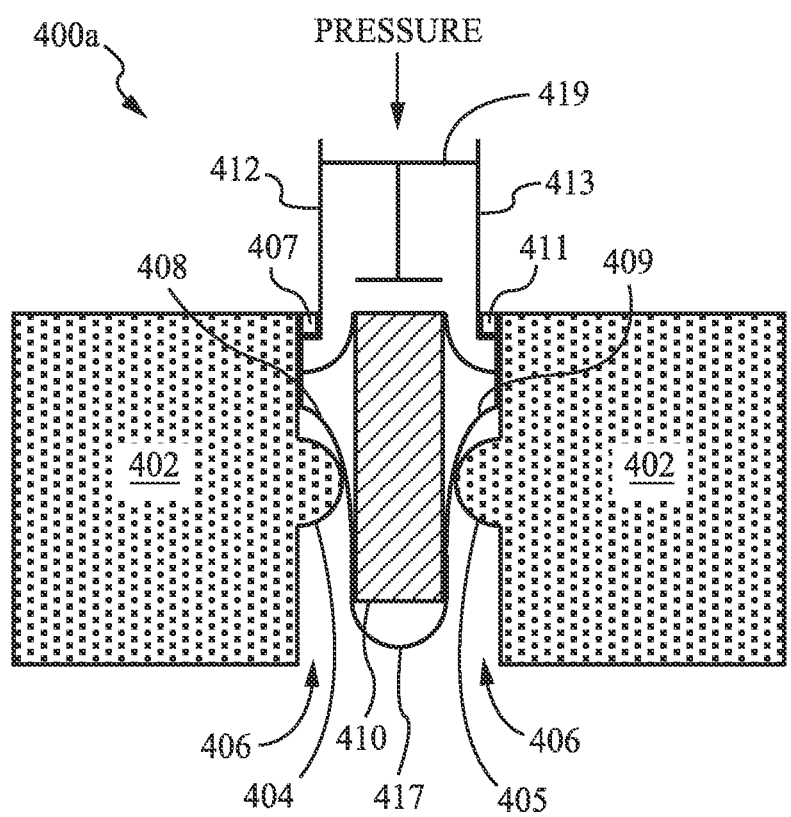
FIG. 4A illustrates a cross section view of a silicone plug positioned for sealing a powder hole according to an embodiment.

FIG. 4A illustrates a cross section view 400a of a silicone plug 410 positioned for sealing a powder hole 406 within an AM part 402 according to an embodiment. These embodiments includes using soft metal expansion pieces in powder hole 406. The deformation of soft metal expansion pieces 408 and 409 is induced by expansion of the silicone plug 410. Attached at the bottom of silicone plug 410 is a stiff lower section 417 adapted to resist deformation. The AM part 402 has protrusions 404 and 405. The soft metal expansion piece 408 is conformed and positioned adjacent to the protrusion 404. The other soft metal expansion piece 409 is conformed and positioned adjacent to the protrusion 405. Additionally, locator guides 412 and 413 can be attached with nuts 407 and 411 near the expansion pieces 408 and 409, respectively. A tool 419 for applying pressure to the silicone plug 410 can be placed in the region above the powder hole 402 and aligned between locator guides 412 and 413. The tool 419 can engage with nuts 407 and 411 to obtain the necessary leverage to apply pressure in the downward vertical direction relative to the powder hole 402.

Figure 4B:
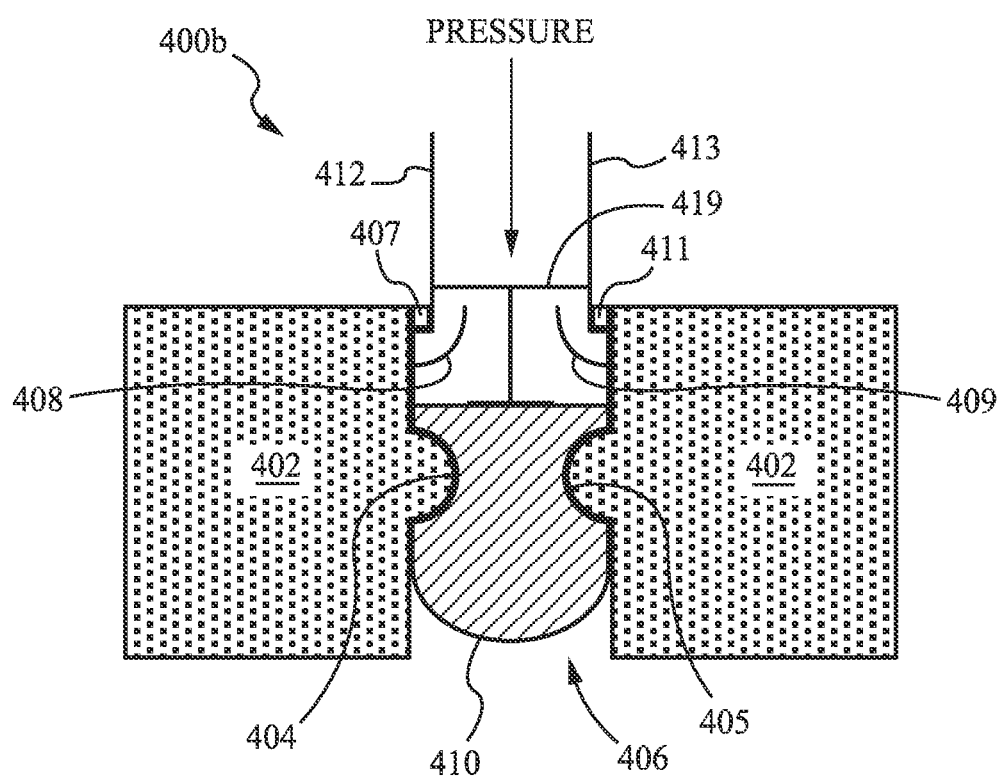
FIG. 4B illustrates a cross section view of the silicone plug of FIG. 4A after expansion within the powder hole.

FIG. 4B illustrates a cross section view 400b of the silicone plug 410 of FIG. 4A after the tool 419 has been used to apply pressure in the downward vertical direction into the powder hole 406. The tool 419 can be used to grab nuts 407 and 411 to apply the downward pressure and expand the silicone plug 410 in a wider configuration extending substantially between and/or beyond the guides 412 and 413. The resulting change in shape of the silicone plug 410 induces a corresponding expansion of the metal expansion pieces 408 and 409 such that pieces 408 and 409 can conform to the shape of adjacent AM parts 402. Alternatively, the silicone plug 410 can be manually placed between the guides 412 and 413 prior to insertion of tool 419. As shown, the silicone plug 410 may rest at the bottom of or beneath the soft metal expansion pieces 408 and 409. In addition to the metal expansion pieces being expanded to conform to AM parts 402, the deformed silicone plug 410 may form a strong seal around protrusions 404 and 405. Further, the bottom part of silicone plug 410 retains a curvature due to the rigid structure 417 attached to the plug as shown in FIG. 4A. The entire structure may result in a strong seal for the powder hole.

Figure 5:
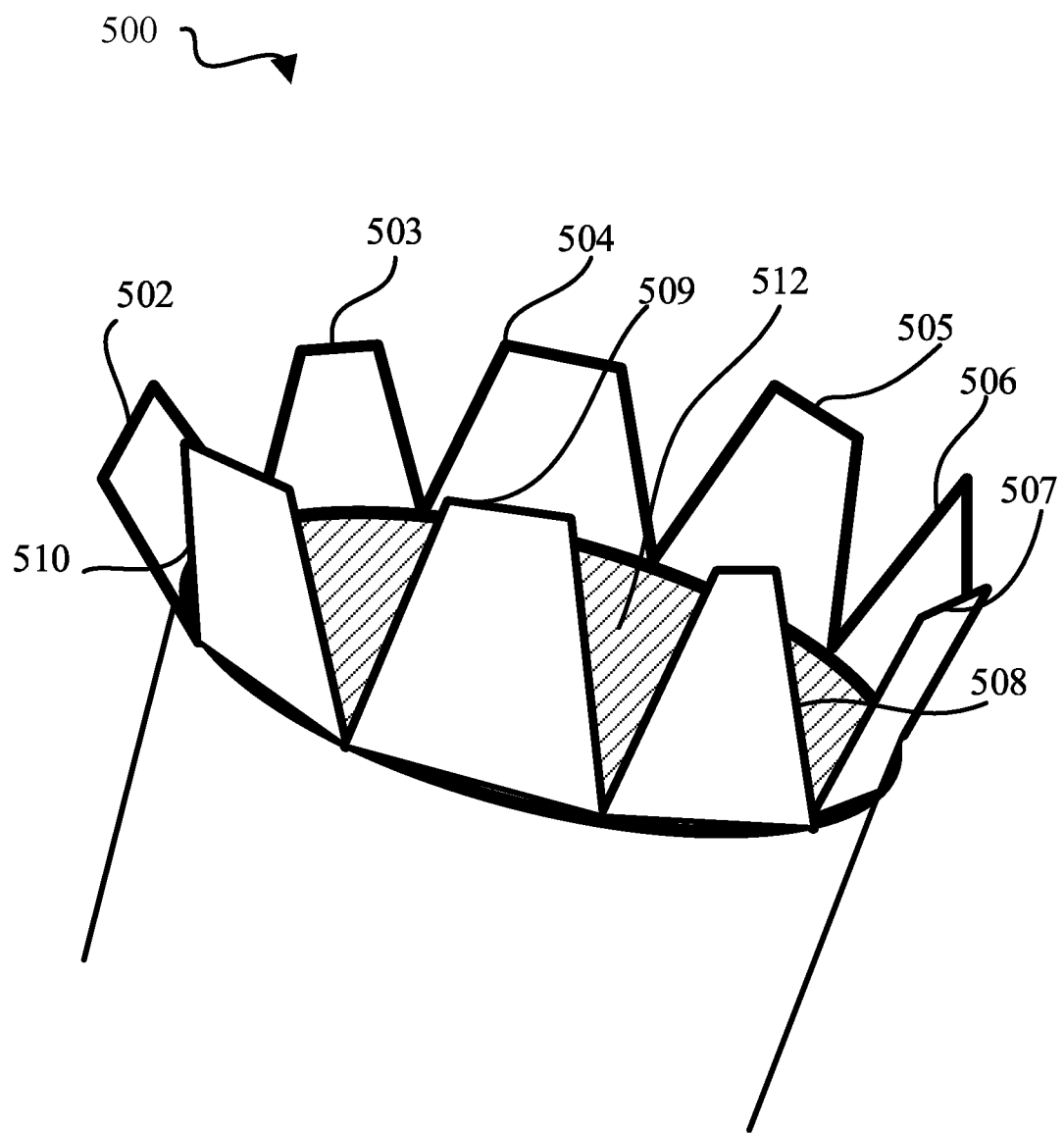
FIG. 5 illustrates a top perspective view of a cylindrical shaped 3-D printed structure having a powder hole and co-printed tangs according to an embodiment.

FIG. 5 illustrates a top perspective view 500 of a cylindrical shaped 3-D printed structure having powder hole 512 and co-printed tangs 502-510 according to an embodiment. The tangs 502-510 can be additively manufactured to be thin strips of metal. The tangs 502-510 can be oriented in the same direction as the powder hole 512, thereby advantageously eliminating the need for support material. Additionally, the tangs 502-510 can be crimped to effectively seal the powder hole 512 by application of a mechanical force. The tangs 502-510 can be designed to overlap when crimped, so as to form a flattened closed region above the powder hole 512. In some embodiments, an adhesive or sealant may be added to further seal the powder hole after the tangs have been crimped.

Figure 6A:
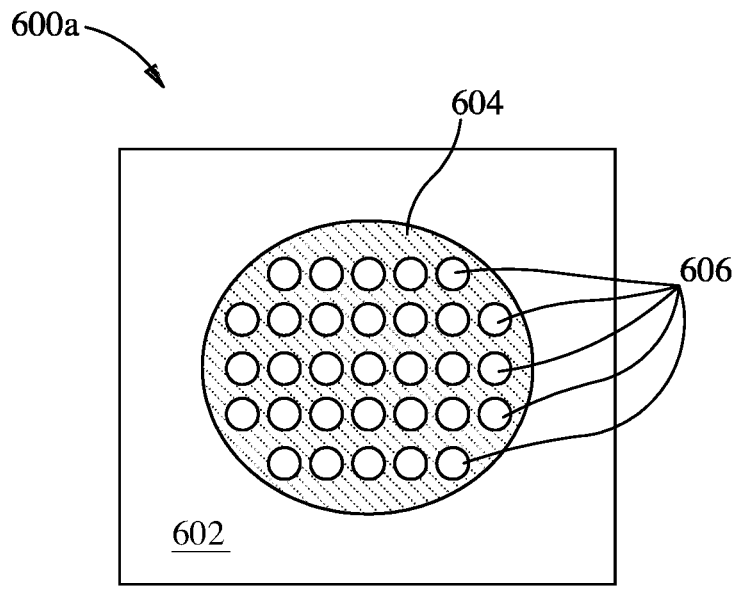
FIG. 6A illustrates a top view of a 3-D printed structure having powder hole using multiple micro holes according to an embodiment.
Figure 6B:
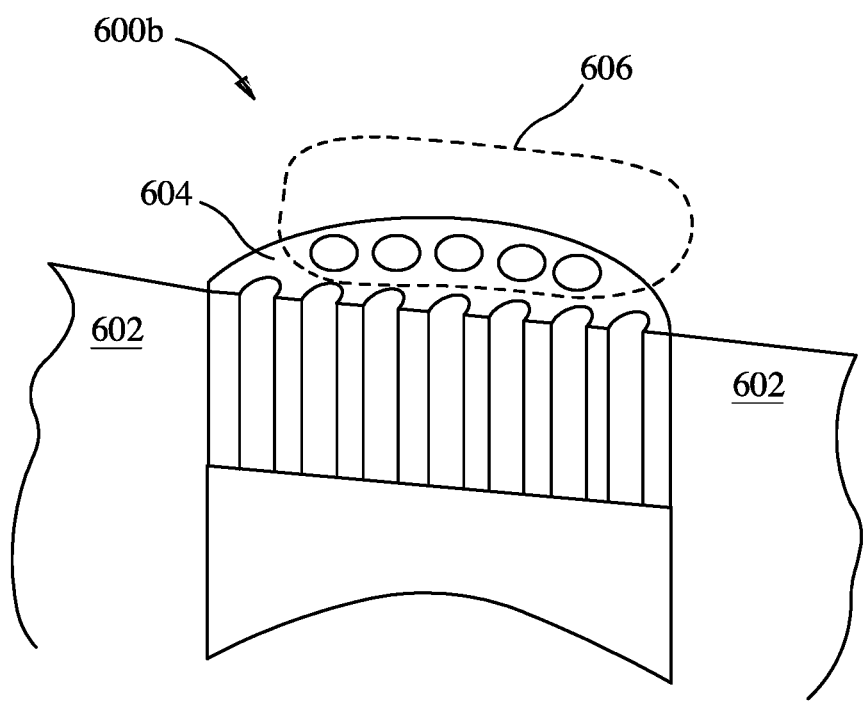
FIG. 6B illustrates a cross section view of the powder hole of FIG. 6A.

FIG. 6A illustrates a top view 600a of a 3-D printed structure 602 with a powder hole 604 using multiple holes 606 according to an embodiment. Similarly, FIG. 6B illustrates a cross section view 600b of the powder hole 604. Residual powder within the AM part 602 can be removed through the holes 606. Then, a sealant and/or adhesive can be disposed on the plurality of smaller holes in order to seal them. A lid or other surface object may also be adhered to the part 602 to cover the holes. The multiple holes 606 may be used primarily as a feeling mechanism for equipment to locate the powder hole features. In an embodiment, the multiple powder holes 606 are incorporated at the surface of the powder hole 604, but these multiple smaller holes 606 do not feed all the way in and through the part. Rather, the smaller holes 606 may terminate in an area shortly below the surface, where the bigger channel may feed the powder into them. Eliminating the requirement that the smaller holes 606 extend all the way through the larger powder hole 604 advantageously reduces mass of the overall part, in addition to simplifying and shortening the overall print job.

Figure 7A:
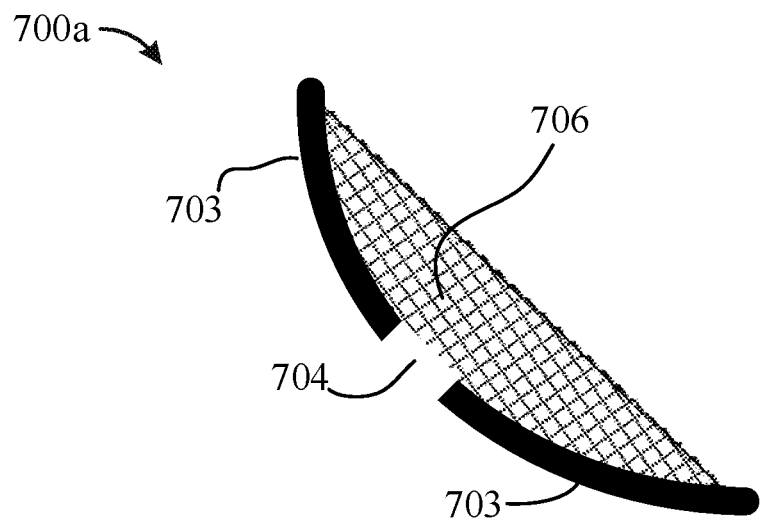
FIG. 7A illustrates a cross section view of a powder hole exposing a lattice structure in an additively manufactured surface according to an embodiment.

FIG. 7A illustrates a cross section view 700a of a powder hole 704 exposing a lattice structure 706 in an additively manufactured surface 703 according to an embodiment. The part surface 703 may be printed with the internal lattice structure and with the powder hole 704 and exposed lattice 706. In other embodiments, the powder hole 704 may be formed by removing a portion of the part surface 703 after the AM process. The powder hole 704 may be used for easy removal of trapped powder due to the print.

Figure 7B:
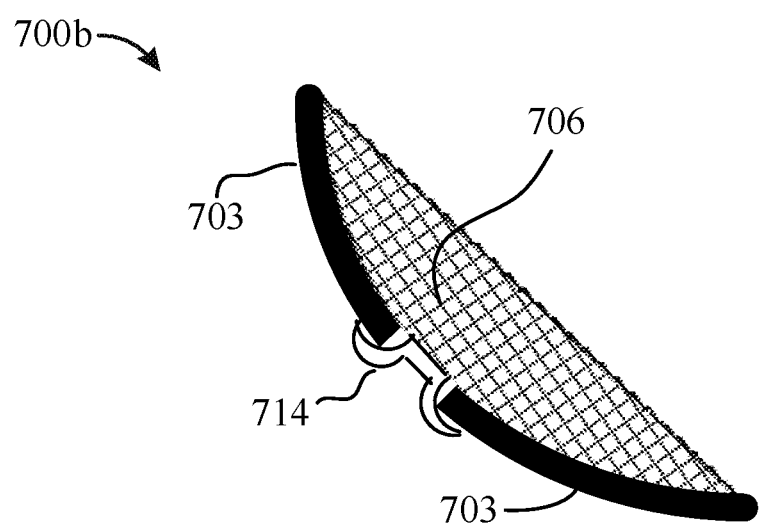
FIG. 7B illustrates a cross section view of the powder hole of FIG. 7A after sealing with a layup.

FIG. 7B illustrates a cross section view 700b of the powder hole 704 after sealing with a layup 714. The layup 714 can be an aluminum alloy and/or composite material. Alternatively, the layup 714 can be a material such as fiberglass.

Figure 7C:
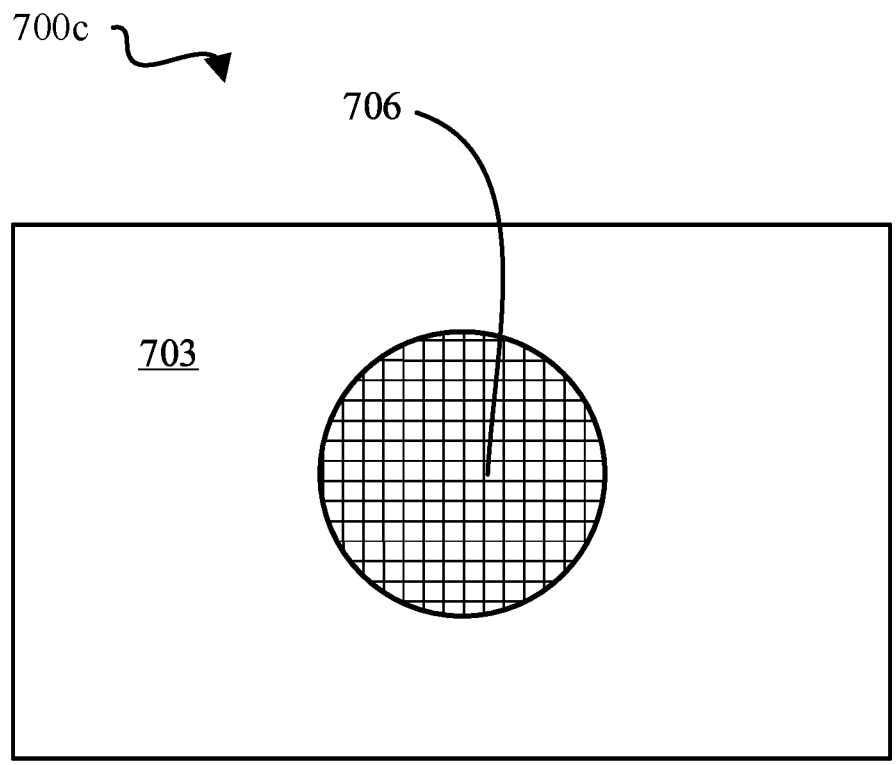
FIG. 7C illustrates a top view of the powder hole and exposed lattice of FIG. 7A.
Figure 7D:
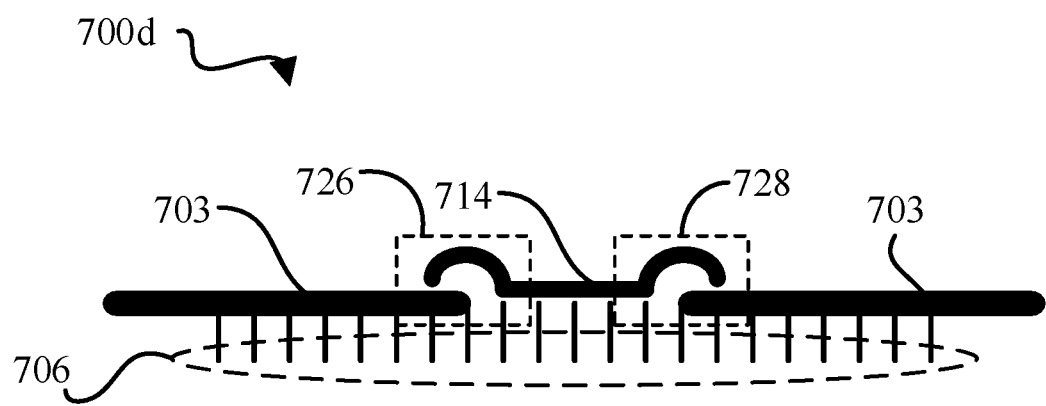
FIG. 7D illustrates a cross section side view of the lattice and layup of FIG. 7B.

FIG. 7C illustrates a top view 700c of the powder hole and exposed lattice 706. FIG. 7D illustrates a cross section side view 700d of the lattice 706 and layup 714. Once the residual powder is removed, the layup 714 may be adhered over the powder hole 704 and exposed lattice 706 so as to protect the lattice 706. As shown in FIG. 7D, additional adhesive may be applied in the layup sections 726 and 728 to further secure the layup.

Figure 8A:
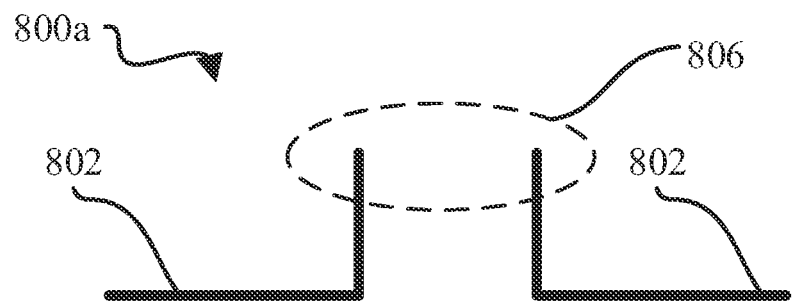
FIG. 8A illustrates a cross section side view of a powder hole with co-printed outward flanges according to an embodiment.
Figure 8B:
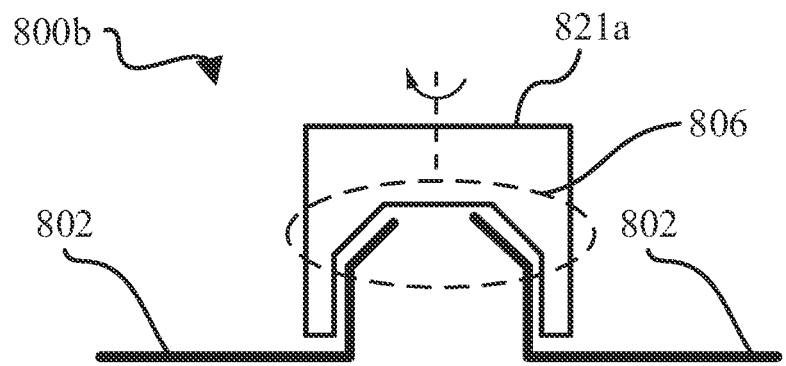
FIG. 8B illustrates a cross section side view of the flange distortion of the powder hole after spinning with a first die.
Figure 8C:
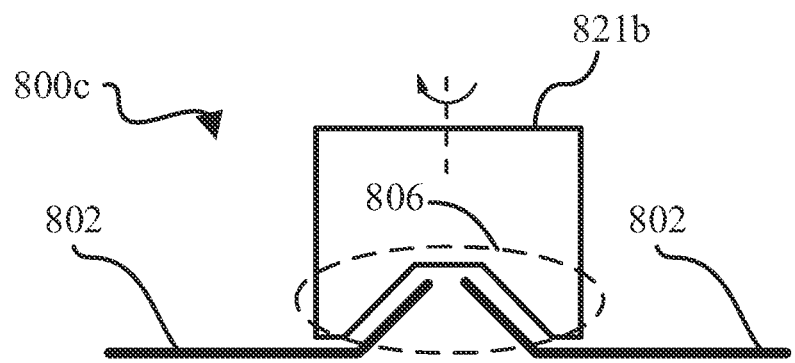
FIG. 8C illustrates a cross section side view of the flange distortion of the powder hole after spinning with a second die.
Figure 8D:
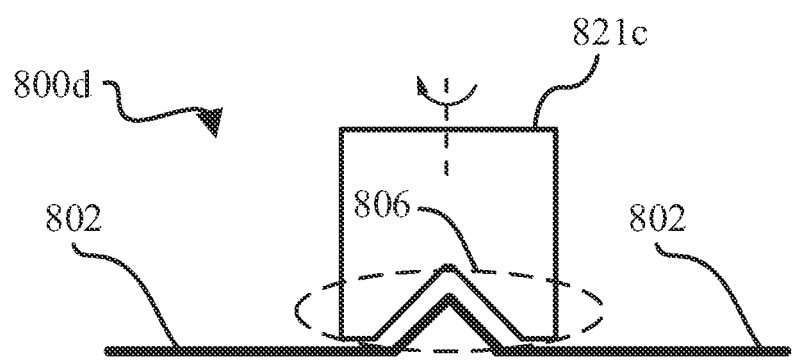
FIG. 8D illustrates a cross section side view of the flange distortion of the powder hole after spinning with a third die.
Figure 8E:
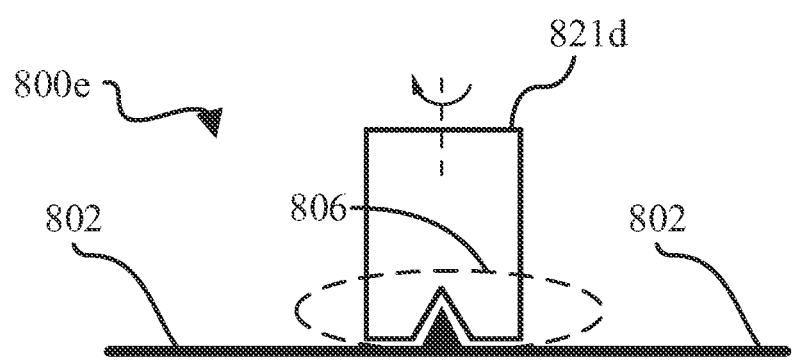
FIG. 8E illustrates a cross section side view of the flange distortion of the powder hole after spinning with a fourth die.

In another embodiment, a powder hole can be closed by using a spin forming process. Spin forming is a process by which a tool is rotated at high speed and formed into an axially symmetric part. Spin forming may also involve the application of elevated temperatures. FIG. 8A illustrates a cross section side view 800a of a powder hole with co-printed outward flanges 806 according to an embodiment. The outward flanges 806 can extend from the surface 802 of an AM part. FIG. 8B illustrates a cross section side view 800b of a spin-forming procedure using the outward flanges 806 and a spin-forming tool such as a computer numerical controlled (CNC) lathe. The spin forming tool may use a variety of dies for shaping the part. FIG. 8B shows the flange distortion of the powder hole after spinning with a first die 821a. FIG. 8C illustrates a cross section side view 800c of the flange distortion of the powder hole after spinning with a second die 821b. FIG. 8D illustrates a cross section side view 800d of the flange distortion of the powder hole after spinning with a third die 821c. FIG. 8E illustrates a cross section side view 800e of the flange distortion of the powder hole after spinning with a fourth die 821d.

The spin forming process may require application of a localized force to the outward flanges 806 while rotating at a high speed. This can cause the part to distort over a mandrel. As described above, a series of die can perform this operation, where the die 821a-d of FIGS. 8A-E may be rotating. The rotation can be used to deform the flange. Towards the completion of rotations, the flange can become very hot such that once the last die distorts the flange, the flanges 806 merge and seal the powder hole. This process may rely on the flange being heated to a temperature above the recrystallization temperature so as to obtain the requisite ductile properties. As shown by the sequence of steps portrayed in FIGS. 8A-E, the plurality of die can be used to spin form the outward flanges 806 from the open position in FIG. 8A to a closed position in FIG. 8E such that the powder hole is sealed.

Figure 9:
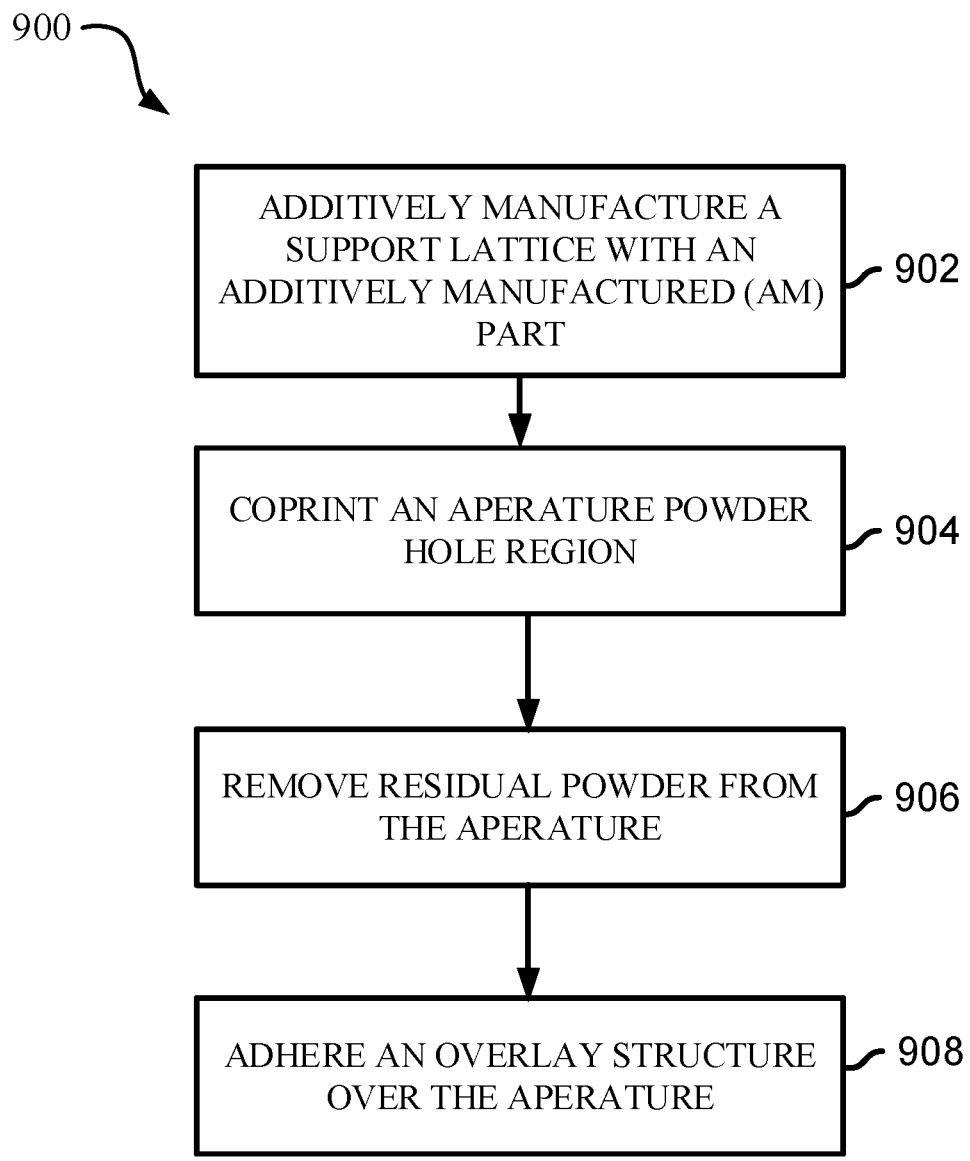
FIG. 9 illustrates a conceptual flow diagram for sealing a powder hole in an additively manufactured part.

FIG. 9 illustrates a conceptual flow diagram 900 for sealing a powder hole in an additively manufactured part. In step 902 an additively manufactured part is co-printed with a lattice structure. As described above with reference to FIGS. 1-8E, residual powder may remain; thus, in step 904 an aperture powder hole region is co-printed with the AM part of step 902. For instance, a powder hole of one or more of the prior FIGS. 1-8E can be co-printed with the AM part. In step 906, residual powder is removed from the AM part via the aperture powder hole region. In step 908 an overlay, such as the overlay of FIG. 7B, is adhered over the powder hole region.

Although the conceptual flow diagram 900 provides an embodiment where an overlay is used in step 908, other flow steps relating to embodiments of FIGS. 1-8E are possible. For instance, instead of using an overlay, the rivet 306 of FIGS. 3A-B can be used to seal the powder hole region.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for sealing powder holes. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
   an exterior structure comprising an inner surface and an external surface;
   an internal lattice structure coupled to the inner surface and configured to mechanically support the exterior structure;
   an aperture within the exterior structure, the aperture exposing a portion of the internal lattice structure; and
   an overlay structure comprising at least one composite material, configured to cover the aperture, wherein the at least one composite material comprises Kevlar.

2. The apparatus of claim 1, wherein the internal lattice structure is honeycomb.

3. The apparatus of claim 1, wherein the internal lattice structure is additively manufactured and the aperture is configured for powder removal.

4. The apparatus of claim 1, wherein the exterior structure is a vehicle panel.

5. The apparatus of claim 1, wherein the overlay structure is attached to the external surface with an adhesive.

6. The apparatus of claim 1, wherein the at least one composite material further comprises carbon fiber.

7. An apparatus comprising:
   an exterior structure comprising an inner surface and an external surface;
   an internal lattice structure coupled to the inner surface and configured to mechanically support the exterior structure;

an aperture within the exterior structure, the aperture exposing a portion of the internal lattice structure; and an overlay structure comprising at least one composite material, the overlay structure configured to cover the aperture, wherein the at least one composite material comprises a prepreg.

8. The apparatus of claim 7, wherein the internal lattice structure is honeycomb.

9. The apparatus of claim 7, wherein the internal lattice structure is additively manufactured.

10. The apparatus of claim 7, wherein the aperture is configured for powder removal.

11. The apparatus of claim 7, wherein the overlay structure further comprises a lip overlapping the aperture.

12. The apparatus of claim 7, wherein the at least one composite material further comprises carbon fiber.

13. The apparatus of claim 7, wherein the exterior structure is a vehicle panel.

* * * * *